(12) United States Patent
Combs

(10) Patent No.: US 9,436,925 B2
(45) Date of Patent: Sep. 6, 2016

(54) INVENTORY MANAGEMENT

(71) Applicant: James Andrew Combs, Houston, TN (US)

(72) Inventor: James Andrew Combs, Houston, TN (US)

(*) Notice: Subject to any disclaimer, the term of this patent is extended or adjusted under 35 U.S.C. 154(b) by 32 days.

(21) Appl. No.: 14/504,030

(22) Filed: Oct. 1, 2014

(65) Prior Publication Data

US 2016/0098671 A1     Apr. 7, 2016

(51) Int. Cl.
*G06K 7/00*     (2006.01)
*G06Q 10/08*     (2012.01)
*G06K 19/06*     (2006.01)

(52) U.S. Cl.
CPC ......... *G06Q 10/087* (2013.01); *G06K 19/0614* (2013.01); *G06K 19/06028* (2013.01); *G06K 19/06037* (2013.01)

(58) Field of Classification Search
USPC ............... 235/375, 385, 435, 439, 454, 462; 705/5, 35–45
See application file for complete search history.

(56) References Cited

U.S. PATENT DOCUMENTS

| | | | |
|---|---|---|---|
| 2006/0282168 A1* | 12/2006 | Sherman | A61B 17/1707 623/18.12 |
| 2014/0097239 A1* | 4/2014 | Bayliff | G06Q 10/20 235/375 |
| 2015/0052024 A1* | 2/2015 | Apsley | G06Q 30/0635 705/26.81 |

OTHER PUBLICATIONS

Adrian Gonzalez, Amazon's 3D Printing Patent: The Quixotic Quest for Instant Delivery?, https://www.linkedin.com/pulse/amazons-3d-printing-patent-quixotic-quest-instant-adrian-gonzalez, Mar. 5, 2015.

* cited by examiner

*Primary Examiner* — Matthew Mikels
(74) *Attorney, Agent, or Firm* — Howard L. Speight, PLLC

(57) ABSTRACT

A device includes a code that is interpretable to identify a three-dimensional (3D) design specification by which a replacement for the device can be printed on a 3D printer.

20 Claims, 3 Drawing Sheets

INVENTORY MANAGEMENT

BACKGROUND

It is currently economically challenging for companies, manufacturers, and warehouses to store and produce a wide variety of prosthetics and prosthetic enhancements anatomically designed for a particular consumer's needs. Moreover, it is challenging for consumers to procure, replace, and/or duplicate anatomically designed prostheses and/or prosthetic enhancements in a timely fashion.

SUMMARY

In one aspect, a method includes reading a code associated with a device, wherein the code is interpretable to identify a three-dimensional (3D) design specification by which a replacement for the device can be printed on a 3D printer, interpreting the code, and transmitting the interpretation to a processor that holds the 3D design specification of the device that is identified by the interpretation. A second entity has an ownership interest in the processor.

Implementations may include one or more of the following. The method may include receiving the 3D design specification of the device by a 3D printer and 3D printing a new version of the device on the 3D printer. A first entity may have an ownership interest in the device. A second entity may have an ownership interest in the processor. A third entity may have an ownership interest in the 3D printer. The first entity, second entity, and the third entity may be different entities. The first entity, second entity, and the third entity may be the same entity. Two of the first entity, second entity, and the third entity may the same entity and the third of the first entity, second entity and the third entity may be different from the other two entities. The processor may determine that the requestor has a right to a new version of the device.

In another aspect, an apparatus includes a device and a code on the device. The code is interpretable to identify a three-dimensional (3D) design specification by which a replacement for the device can be printed on a 3D printer.

Implementations may include one or more of the following. The code may include a first-texture area having a first texture, a second-texture area having a second texture different from the first texture, wherein the second texture area is bounded by the first-texture area, and a machine-readable area containing a scannable code. The scannable code may be selected from a group consisting of a bar code, a two-dimensional bar code, and a high capacity color bar code. The code area may be bounded by the second-texture area. The scannable code may include portions of the code area that are raised relative to other portions of the code area. The device may include a prosthesis.

In another aspect, a non-transitory computer-readable medium contains a recording of a computer program. The program includes executable instructions, that, when executed, perform a method. The method includes reading a code associated with a device, wherein the code is interpretable to identify a three-dimensional (3D) design specification by which a replacement for the device can be printed on a 3D printer, interpreting the code, and transmitting the interpretation to a processor that holds the 3D design specification of the device that is identified by the interpretation, wherein a second entity has an ownership interest in the processor.

DETAILED DESCRIPTION

Figure 1:
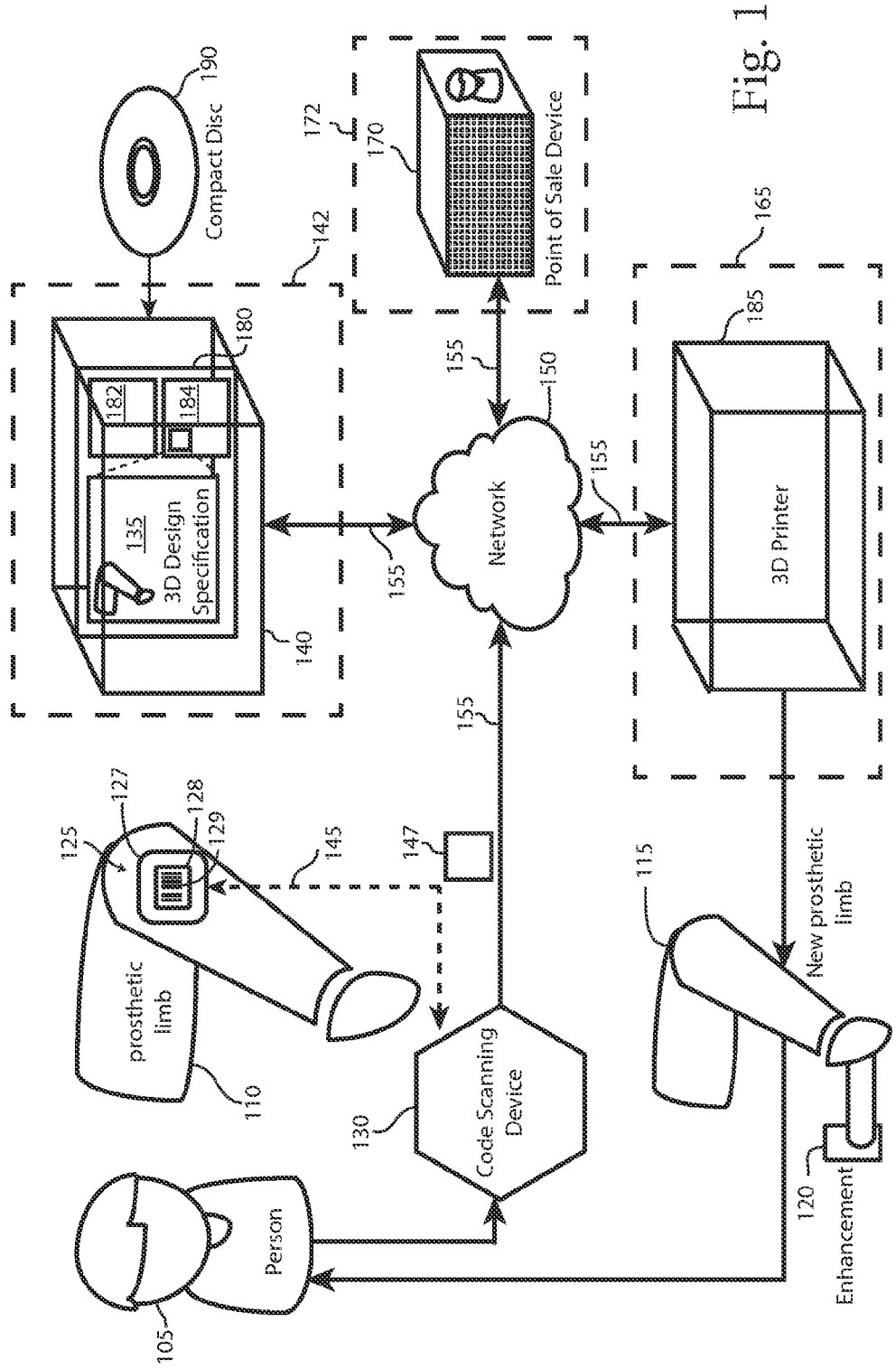
FIGS. 1 and 2 are block diagrams showing remote printing of a new version of a device.

In one or more embodiments, as illustrated in FIG. 1, a person 105 has a prosthetic limb 110 and would like to replace it with a new prosthetic limb 115 because, for example, the prosthetic limb 110 has become damaged or because an upgrade or enhancement is available.

In one or more embodiments, the person 105 has possession of the prosthetic limb 110. In one or more embodiments, the person 105 does not have possession the prosthetic limb 110. For example, the person 105 may have left the prosthetic limb 110 in a repair shop or a retail store to perform a repair or replacement. In one or more embodiments, the person 105 has ownership of the prosthetic limb 110. In one or more embodiments, the person 105 does not have ownership of the prosthetic limb 110. For example, the person 105 may have been loaned the prosthetic limb 110, the person 105 financed the purchase of the prosthetic limb 110 through a bank loan (where the bank retains an interest in the prosthetic limb 110 until the loan is repaid), or the person 105 may have been provided the prosthetic limb 110 as part of a charitable activity.

In one or more embodiments, the person 105 initiates a request for a new prosthetic limb 115. In one or more embodiments, the request includes a request that the new prosthetic limb include an enhancement 120. In one or more embodiments, the enhancement 120 will enable the person 105 to perform tasks or overcome obstacles. In one or more embodiments, the enhancement 120 includes an appendage (e.g., a hook, grip or anatomical hand) that attaches to the new prosthetic limb 115.

In one or more embodiments, the person 105 initiates the request for the new prosthetic limb 115 and/or enhancement 120 by reading (e.g., scanning) a code 125 on the prosthetic limb 110 using a code-scanning device 130, such as a bar code reader.

In one or more embodiments, the code 125 is a bar code. In one or more embodiments, the code 125 is a raised bar code (i.e., the bars are raised with respect to the surface of the prosthetic limb 110) having the same color or a very similar color to the prosthetic limb 110. In one or more embodiments, reading the code 125 involves scattering light from the raised code 125 in such a way that the scattered light can be read and interpreted by the code-scanning device 130.

In one or more embodiments, the code 125 is an embossed bar code (i.e., the bars are in relief or recessed with respect to the surface of the prosthetic limb 110). In one or more embodiments, reading the code 125 involves scattering light from the embossed code 125 in such a way that the scattered light can be read and interpreted by the code-scanning device 130.

In one or more embodiments, the code 125 is a two-dimensional (or matrix) bar code (such as an Aztec code or a data matrix). In one or more embodiments, the code 125 is a high capacity color bar code. In one or more embodiments, the code 125 is multi-colored.

In one or more embodiments, the code 125 includes a first-texture area 127 having a first texture (i.e., rough, smooth, pebbled, grooved, cross-hatched, etc.), a second-texture area 128 having a second texture different from the first texture, and a machine-readable area 129. In one or more embodiments, the machine-readable area 129 includes a bar code, such as that described above. In one or more embodiments, the second-texture area 128 is bounded by the first-texture area 127, as shown in FIG. 1. In one or more embodiments (not shown), the second-texture area 128 overlaps the first-texture area 127. In one or more embodiments, the machine-readable area 129 is bounded by the second-texture area 128, as shown in FIG. 1. In one or more embodiments (not shown), the machine-readable area 129 overlaps the first-texture area 127 and the second-texture area 128.

In one or more embodiments, the code 125 is divided between two or more devices. In one or more embodiments, the divided code 125 is read by the code-scanning device 130 in sequence. In one or more embodiments, the divided code 125 includes a bar code, or the like, and a code that is read visually by a user and entered into a processor.

In one or more embodiments, the code 125 includes information sufficient to identify a three-dimensional (3D) design specification 135 for the new prosthetic limb 115. In one or more embodiments, the 3D design specification 135 is stored on a processor 140. In one or more embodiments, the processor 140 is in possession of the person 105. In one or more embodiments, the person 105 owns the processor 140. In one or more embodiments, the processor 140 is in the possession of a second entity 142. In one or more embodiments, the second entity 142 owns the processor 140. In one or more embodiments, the second entity 142 is a consumer, organization, company, or government, or other similar entity. In one or more embodiments, the 3D design specification 135 includes specifications for printing prostheses and prosthetic accessories.

In one or more embodiments, once the code-scanning device 130 reads the code 125, as indicated by a dashed line 145, the code-scanning device 130 interprets the code 125 and transmits an interpretation 147 over a network 150 as indicated by lines 155, to the processor 140. In one or more embodiments, the network 150 includes the Internet. In one or embodiments, the network 150 includes a wide area network (WAN). In one or more embodiments, network 150 includes a local area network (LAN). In one or more embodiments, the network 150 includes a virtual private network (VPN). In one or more embodiments, the network 150 includes a BLUETOOTH® link. In one or more embodiments, portions of the network 150 include a wireless network. In one or more embodiments, portions of the network 150 include a wired network. In one or more embodiments, portions of the network include a satellite link.

In one or more embodiments, the processor 140 uses the interpretation 147 of the code 125 to access from a memory 180 the 3D design specification 135 of the prosthetic limb 110 and/or of the upgraded version of the prosthetic limb 110 and/or of the enhancement 120 and transmits the 3D design specification 135 to a 3D printer 185 as indicated by lines 155. In one or more embodiments, the memory 180 is an electronic data storage system, such as a solid state memory or a hard drive. In one or more embodiments, the memory 180 and the processor 140 are one integrated unit. In one or more embodiments, the memory 180 and the processor 140 are separate units (e.g., the memory 180 is an external drive or is stored at another location).

In one or more embodiments, the processor 140 performs a search of a purchase inventory 182, which is a list of entities entitled to print new prosthetic limbs 115 (or another item under control of the processor 140) to verify that the person 105 has the right to purchase or otherwise acquire the new prosthetic limb 115. In one or more embodiments, the person 105 acquires such a right through a purchase at, for example, a point of sale device 170 in a retail store 172. In one or more embodiments, the retail store 172 may have previously acquired its own right to print one or more new prosthetic limbs 115 thereby creating an "inventory" (different from the purchase inventory 182) of new prosthetic limbs 115 at the retail store 172. In one or more embodiments, the person 105 acquires this right through a licensing transaction by which the person 105 is entitled to print one or more new prosthetic limbs 115.

In one or more embodiments, the memory 180 (or some other storage device) stores a specifications inventory 184 of multiple 3D design specifications, which includes 3D design specification 135, to produce a range of new prosthetic limbs 115. In one or more embodiments, the purchase inventory 182 includes records that indicate whether or not the person 105 has the right to receive the new prosthetic limb 115, which can be acquired through the purchasing transaction described above. In one or more embodiments, the purchase inventory 182 and the specifications inventory 184 are part of a single database (not shown). In one or more embodiments, the purchase inventory 182 is split among multiple databases and/or multiple memory devices (not shown). In one or more embodiments, the specifications inventory 184 is split among multiple databases and/or multiple memory devices (not shown).

In one or more embodiments, the processor 140 uses the interpretation 147 to search the specifications inventory 184 for the 3D design specification 135 of the prosthetic limb 110. In one or more embodiments, the processor 140 transfers the 3D design specification 135 through the network 150 to the 3D printer 185. In one or more embodiments, the 3D printer 185 is in the possession of a third entity 165. In one or more embodiments, the third entity 165 owns the 3D printer 185. In one or more embodiments, the third entity 165 is a consumer, organization, company, government, etc.

In one or more embodiments, the processor 140 confirms that the 3D printer 185 received the 3D design specification 135. In one or more embodiments, the processor 140 requests confirmation from the 3D printer 185 that the 3D printer 185 printed the new prosthetic limb 115 of the prosthetic limb 110. In one or more embodiments, the processor 140 closes the transaction and updates the purchase inventory 182 by, for example, reducing the number of new prosthetic limbs 115 of the prosthetic limb 110 that the person 105 can print using the process illustrated in FIG. 1.

In one or more embodiments, the 3D printer 185 includes a printer with additive manufacturing capabilities, such as, for example, 3D printers available from such manufacturers as MAKERBOT®. In one or more embodiments, the 3D Printer 185 includes a printer with subtractive manufacturing capabilities. For example, a subtractive manufacturing printer may include a computer numeric control (CNC) tool available from such manufacturers as MAKINO®.

In one or more embodiments, this process is stored in a non-transitory computer-readable medium 190, on which is recorded a computer program. In one or more embodiments, the program includes executable instructions, that, when executed, perform the request or causes the request to be performed (i.e., by causing the tasks described herein to be performed). In one or more embodiments, the computer-readable medium 190 includes a compact disc, a removable flash drive, secure digital (SD) card, micro-SD card, an external hard drive or semiconductor drive, or a similar device.

Figure 2:
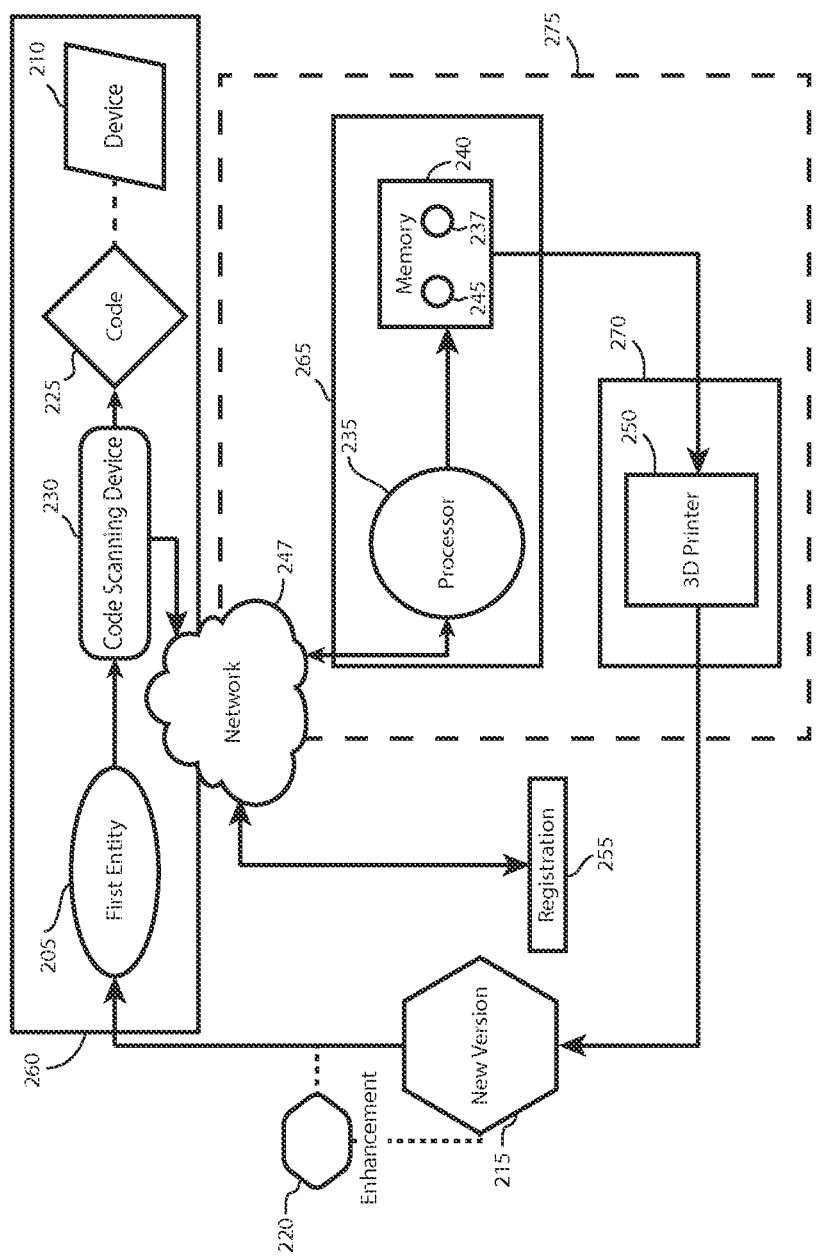

In a more abstract representation of the equipment and process described above, illustrated in FIG. 2, a first entity 205 (such as the person 105 shown in FIG. 1) can be a person, an organization, a corporation, a government, or another entity.

In one or more embodiments, a device 210 includes a prosthesis (such as the prosthetic limb 110), a tool, a part, or any item capable of manufacture. In one or more embodiments, a new version 215 includes a prosthesis (such as the new prosthetic limb 115), a tool, a part, or any item capable of manufacture. In one or more embodiments, the new version 215 includes an upgraded version of the device 210.

In one or more embodiments, an enhancement 220 (such as enhancement 120) includes any item capable of manufacture. For example, the enhancement 220 may include an accessory that is capable of attaching to the new version 215. The enhancement 220 may also include a tool or utensil customized to mount on the new version 215. A new version 215 may also be an upgraded or revised version of the device 210. In one or more embodiments, the device 210 and the new version 215 of the device 210 are not prosthetics and instead include another type of device, such as a part for a gun, automobile, or other similar types of manufacture.

In one or more embodiments, a code 225 is read visually by the first entity 205 and manually entered into a code-scanning device 230 (or into another processor, such as a cellular telephone or a computer). In one or more embodiments, in which the first entity 205 is a visually impaired person, the code 225 is read physically (e.g., by using Braille) by touching the code 225. In or more embodiments, the code 225 is read by the first entity 205 then verbally entered into the code-scanning device 230, which executes voice recognition software. In one or more embodiments, the code 225 is imprinted on the device 210 with ink, florescent ink, or invisible ink. In one or more embodiments, the code 225 further includes an element, which is in low contrast to other elements visible on the device 210 (e.g., the first-texture area 127 and second-texture area 128 described above).

In one or more embodiments, the code 225 is not imprinted on the device 210 but is an independent element associated with the device 210. For example, the code 225 may be an access card (such as a magnetic strip card, an electronic "smart" card, a USB drive or similar portable memory), storing the same information as the code 125 (shown in FIG. 1) imprinted on the device 210. This feature allows for protection of the code 225 in cases where the device 210 is severely damaged or lost. In one or more embodiments, such access card stores the 3D design specification 135, or a portion thereof, which can be read by the 3D printer 185 or by a computer coupled to the 3D printer 185. In one or more embodiments, the code is a radio frequency identification (RFID) tag and the code-scanning device 230 is an RFID reader or interrogation device.

In one or more embodiments, a 3D design specification 245 includes specifications useful to cause a 3D printer 250 to print the new version 215 which may be a prosthesis (such as new prosthetic limb 115), a part for a gun, a part for an automobile, any item capable of manufacture.

In one or more embodiments, the code-scanning device 230 includes a wireless hand-held scanner, a hard wired hand-held scanner, a cellular device scanner (i.e., such as a cellular device (e.g., cellular telephone or cellular pad) with a QR code scanning or bar scanning application), or a non-cellular version (i.e., that operate via wireless or satellite links) of such devices, operated by integrated software applications. In one or more embodiments, the code-scanning device 230 includes integrated voice recognition capability for interpreting and recording the code 225 spoken by the first entity 205. In one or more embodiments, the code-scanning device 230 includes a personal computer (PC) with software for recognizing and identifying the 3D design specifications 245.

In one or more embodiments, the processor 235 performs a purchase transaction to verify that the first entity 205 has the right to acquire the new version 215. In one or more embodiments, the right is stored in a purchase inventory 237. In one or more embodiments, the first entity 205 acquires this right as described above in connection with the description of FIG. 1 and/or through a registration 255 at, for example, a web-based provider (such as eBay, Amazon, or a web-based provider dedicated to providing this service, etc.)(not shown).

In one or more embodiments, the processor 235 transfers the 3D design specification 245 directly to the 3D printer 250 via a direct connection. For example, the processor 235 may transfer the 3D design specification 245 through a universal serial bus (USB) cable, or any other physical port method, directly to the 3D printer 250. In one or embodiments, the processor 235 transfers the 3D design specification 245 via a network 247. In one or more embodiments, portions of the network 247 are in a first location 260. In one or more embodiments, portions of the network 247 are in a second location 265. In or more embodiments, portions of the network 247 are in a third location 270.

In one or more embodiments, the processor 235 interprets the code 225 and uses the interpretation to access from a memory 240 the 3D design specification 245 of the device 210 and/or of the new version 215 of the device 210 and transmits the 3D design specification 245 to the 3D printer 250 at the third location 270. In one or more embodiments, the processor 235 and memory 240 may include a computer or server with an internal hard drive, or external hard drive that stores electronic data, or any other electronic system that is capable of responding to the request.

In one or more embodiments, the processor 235 is integrated with the 3D printer 250 as indicated by dashed rectangle 275. In one or more embodiments, the 3D printer 250 prints the new version 215 of the device 210. In one or more embodiments, the 3D printer 250 prints the enhancement 220. In one or more embodiments, the 3D printer 250 prints the enhancement 220 and the new version 215 as one integrated unit. In one or more embodiments, the enhancement 220 is detachable from the new version 215 after it is printed from the 3D printer 250.

In one or more embodiments, the first entity 205 is in the first location 260. In one or more embodiments, the code-scanning device 230 is in the first location 260. In one or more embodiments, the device 210 is in the first location 260. In or more embodiments, the code 225 is in the first location 260. In one or more embodiments, the processor 235 is in the first location 260. In one or more embodiments, the processor 235 is inaccessible to the first entity 205 in the first location 260. In one or more embodiments, the 3D printer 250 is in the first location 260. In one or more embodiments, the 3D printer 250 is accessible to the first entity 205.

In one or more embodiments, the first entity 205 is at the second location 265. In one or more embodiments, the code-scanning device 230 is in the second location 265. In one or more embodiments, the device 210 is in the second location 265. In or more embodiments, the code 225 is in the second location 265. In one or more embodiments, the processor 235 is in the second location 260. In one or more embodiments, the 3D printer 250 is in the second location 265.

In one or more embodiments, the first entity 205 is in a third location 270. In one or more embodiments, the code-scanning device 230 is in the third location 270. In one or more embodiments, the device 210 is in the third location 270. In or more embodiments, the code 225 is in the third location 270. In one or more embodiments, the processor 235 is in the third location 260. In one or more embodiments, the 3D printer 250 is in the third location 265.

In one or more embodiments, the first location 260 is the same as the second location 265. In one or more embodiments, the first location 260 is the same as the third location 270. In one or more embodiments, the second location 265 is the same as the third location 270.

In one or more embodiments, the first location 260, the second location 265, and the third location 270 are the same.

In one or more embodiments, the first location 260, the second location 265, and the third location 270 are remote from each other. In one or more embodiments, "remote" is defined to mean at least 10 meters. In one or more embodiments, "remote" is defined to mean at least 100 meters. In one or more embodiments, "remote" is defined to mean at least 1000 meters. In one or more embodiments, "remote" is defined to mean accessible only by electronic means. In one or more embodiments, "remote" is defined to mean physically inaccessible (i.e., sufficiently far apart that a person standing at one location cannot touch a person standing at another location, or blocked from a physical connection by, for example, a wall).

In one or more embodiments, the first entity 205 is the same as the person 105 illustrated in FIG. 1. In one or more embodiments, the first entity 205 is the same as the second entity 142 illustrated in FIG. 1. In one or more embodiments, the first entity 205 is the same as the third entity 165, illustrated in FIG. 1. In one or more embodiments, the second entity 142 is the same the third entity 165.

Figure 3:
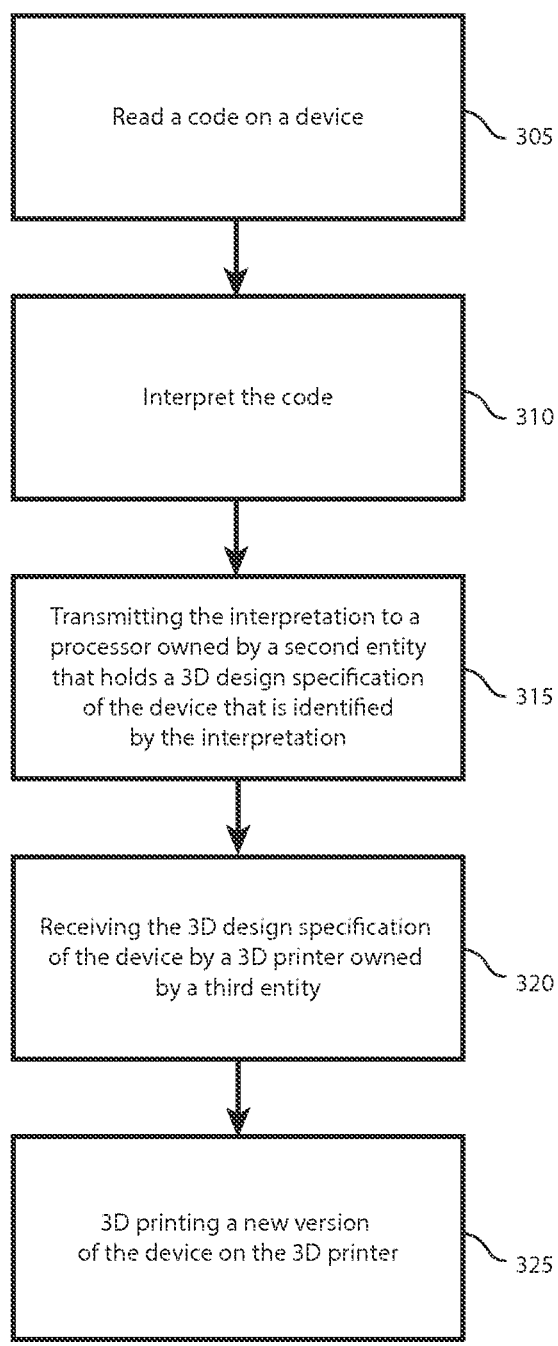
FIG. 3 is a flow chart showing the process of remotely printing a new version of a device.

In one or more embodiments, illustrated in FIG. 3, a process begins by reading a code (such as code 125 or code 225) on a device (such as prosthetic limb 110 or device 210) (block 305). In one or more embodiments, the code is interpreted (block 310) to produce an interpretation (such as interpretation 147). In one or more embodiments, the interpretation (such as interpretation 147) is transmitted to a processor (such as processor 140 or processor 235) owned by a second entity (such as second entity 142) that holds a 3D design specification (such as 3D design specification 135 or 3D design specification 245) of the device that is identified by the interpretation (block 315). In one or more embodiments, the 3D design of the device is received by a 3D printer (such as 3D printer 185 or 3D printer 250) owned by a third entity (such as third entity 165) (block 315). In one or more embodiments, the 3D printer prints a new version (such as new prosthetic limb 115 or new version 215) of the 3D design (block 320).

In one or more embodiments, the phrase "ownership interest" is defined to mean partial ownership (e.g., tenancy in common, joint tenant, community property, etc.), full ownership, or a lease interest.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   reading a code with on a medical device, the medical device being attachable to a person, wherein the code is interpretable to identify a three-dimensional (3D) design specification by which a replacement for the medical device can be printed on a 3D printer;
   interpreting the code; and
   transmitting the interpretation to a processor that holds the 3D design specification of the medical device that is identified by the interpretation,
   receiving the 3D design specification of the medical device by a 3D printer; and
   3D printing a new version of the medical device on the 3D printer.

2. The method of claim 1, wherein the medical device comprises a prosthesis.

3. The method of claim 1 wherein a first entity has physical access to the medical device, a second entity has physical access to the processor, and a third entity has physical access to the 3D printer.

4. The method of claim 3 wherein the first entity, second entity, and the third entity are different entities.

5. The method of claim 3 wherein the first entity, second entity, and the third entity are the same entity.

6. The method of claim 3 wherein two of the first entity, second entity, and the third entity are the same entity and the third of the first entity, second entity and the third entity is different from the other two entities.

7. The method of claim 1, further comprising:
   the processor determining that the requestor has a right to a new version of the medical device.

8. An apparatus comprising:
   a medical device, the medical device being attachable to a person;
   a code on the medical device, wherein the code is interpretable to identify a three dimensional (3D) design specification by which a replacement for the medical device can be printed on a 3D printer.

9. The apparatus of claim 8 wherein the code comprises:
   a first-texture area having a first texture;
   a second-texture area having a second texture different from the first texture, wherein the second-texture area is bounded by the first-texture area; and
   a machine-readable area containing a scannable code.

10. The apparatus of claim 9 wherein the scannable code is selected from a group consisting of a bar code, a two-dimensional bar code, and a high capacity color bar code.

11. The apparatus of claim 9 wherein the code area is bounded by the second-texture area.

12. The apparatus of claim 9 wherein the scannable code comprises portions of the code area that are raised relative to other portions of the code area.

13. The apparatus of claim 8, wherein the medical device comprises a prosthesis.

14. A non-transitory computer-readable medium, on which is recorded a computer program, the program comprising executable instructions, that, when executed, perform a method comprising:
   reading a code on a medical device, the medical device being attachable to a person, wherein the code is interpretable to identify a three-dimensional (3D) design specification by which a replacement for the medical device can be printed on a 3D printer;
   interpreting the code; and transmitting the interpretation to a processor that holds the 3D design specification of the medical device that is identified by the interpretation, receiving the 3D design specification of the medial device by a 3D printer; and 3D printing a new version of the medical device on the 3D printer.

15. The non-transitory computer-readable medium of claim 14, wherein the medical device comprises a prosthesis.

16. The non-transitory computer-readable medium of claim 14, wherein a first entity physical access to the medical device, a second entity physical access to the processor, and a third entity physical access to the 3D printer.

17. The non-transitory computer-readable medium claim 16 wherein the first entity, second entity, and the third entity are different entities.

18. The non-transitory computer-readable medium claim 16 wherein the first entity, second entity, and the third entity are the same entity.

19. The non-transitory computer-readable medium claim 16 wherein two of the first entity, second entity, and the third entity are the same entity and the third of the first entity, second entity and the third entity is different from the other two entities.

20. The non-transitory computer-readable medium claim 14, wherein the method further comprises:

the processor determining that the requestor has a right to a new version of the medical device.

* * * * *